United States Patent [19]
Raymond

[11] Patent Number: 4,535,664
[45] Date of Patent: * Aug. 20, 1985

[54] DISPENSER MEANS FOR ROLLED SHEET MATERIALS

[76] Inventor: Gary E. Raymond, 755 S. Rainbow Dr., Hollywood, Fla. 33021

[*] Notice: The portion of the term of this patent subsequent to Jun. 26, 2001 has been disclaimed.

[21] Appl. No.: 623,233

[22] Filed: Jun. 21, 1984

Related U.S. Application Data

[63] Continuation of Ser. No. 415,656, Sep. 7, 1982, Pat. No. 4,455,905.

[51] Int. Cl.³ .............................................. B65H 75/32
[52] U.S. Cl. ........................................ 83/162; 83/383; 83/614; 83/649; 242/55.53
[58] Field of Search ................. 83/386, 383, 436, 508, 83/614, 648–650, 162; 242/55.53, 56 R, 77.1, 77.7, 197–199; 206/409; 352/78 R, 78 C; 225/40

[56] References Cited

U.S. PATENT DOCUMENTS

| | | | |
|---|---|---|---|
| 1,732,148 | 10/1929 | Barrett | 83/383 |
| 2,645,543 | 7/1953 | Mancini | 83/649 X |
| 3,807,267 | 4/1974 | Morrison et al. | 83/650 X |
| 4,325,277 | 4/1982 | Uchida et al. | 83/648 X |
| 4,383,458 | 5/1983 | Kitai | 83/614 X |

Primary Examiner—James M. Meister
Attorney, Agent, or Firm—Bernard J. Murphy

[57] ABSTRACT

The invention comprises a light-tight dispenser for rolled sheet materials, such as negative stock, emulsified paper, and like photographic supplies, having nipping rollers for paying-out of the rolled materials, and a translatable blade for severing a selected length of payed-out material. The dispenser is suspensible from a vertical surface, such as a wall of a room or a panel of a camera unit (which latter may have an entry access for a severed length of the material). The dispenser has a channel which defines a rectilinear frame in which a sheet material cassette is light-sealingly nested and restrained. The cassette intimately engages the innermost portion of the channel to feed sheet material therefrom to the aforesaid nipping rollers, which are in adjacency thereto. The aforesaid frame has a given depth which assures light-sealing of the nested cassette, and the latter and the channel have camming structures cooperative, upon the cassette being inserted into the frame, to cause a sheet material-discharging, leading portion of the cassette to open slightly to facilitate pay-out of the material therewithin.

2 Claims, 9 Drawing Figures

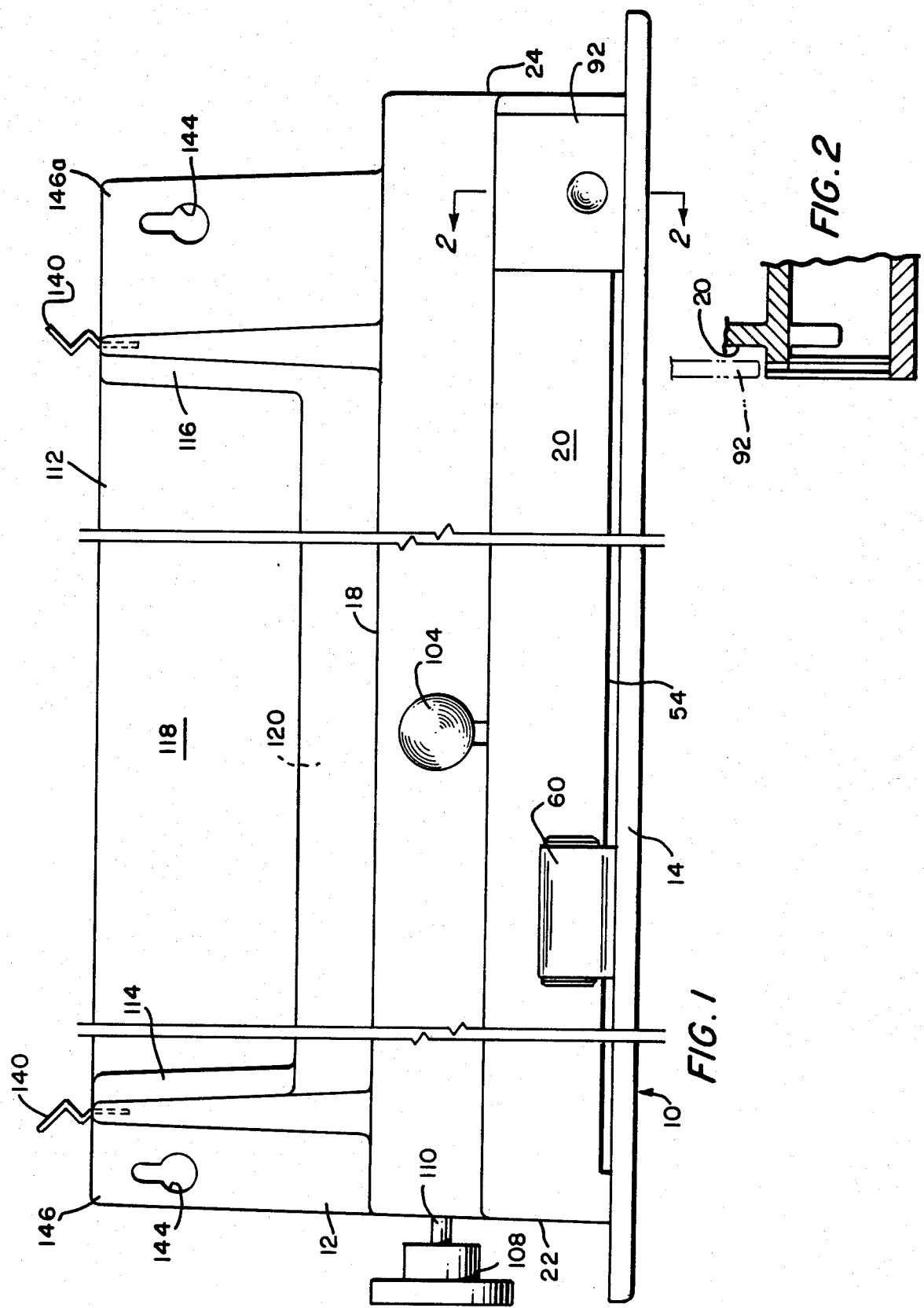

DISPENSER MEANS FOR ROLLED SHEET MATERIALS

This is a continuation of application Ser. No. 415,656, filed Sept. 7, 1982, which issued as U.S. Pat. No. 4,455,905 on June 26, 1984.

This invention pertains to dispensers for sheet materials, and in particular to dispensers for rolled sheet materials, such as negative stock, emulsified paper, and like photographic supplies, having means for severing selected lengths of materials dispensed therefrom.

It is an object of this invention to set forth a dispenser, such as the aforesaid, which is light-tight, and which light-sealingly nests and restrains a sheet material cassette to draw material from the cassette and dispense selected, severed lengths of the material.

Particularly is it an object of this invention to disclose a novel dispenser means for rolled sheet materials, such as negative stock, emulsified paper, and like photographic supplies, comprising a housing; said housing having means therewithin (a) for grasping an end of rolled sheet material, and (b) for moving such sheet material through said housing along a given pathway; said housing also having means therewithin, and interposed intermediate said pathway, for severing a selective length of sheet material; and said housing further having a channel for nestably receiving therewithin a sheet material-discharging portion of a sheet material cassette; wherein said channel is defined by substantially parallel, spaced-apart end walls, and substantially parallel, spaced-apart upper and lower or side walls, forming a substantially rectilinear frame, having a given depth, for light-sealingly nesting therewithin such sheet material-discharging portion of a sheet material cassette.

Further objects of this invention, as well as the novel features thereof, will become more apparent by reference to the following description, taken in conjunction with the accompanying figures, in which:

FIG. 1 is an axially-discontinuous, vertical elevation of an embodiment of the invention;

FIG. 2 is a cross-sectional view taken along section 2—2 of FIG. 1;

Figure 6A:
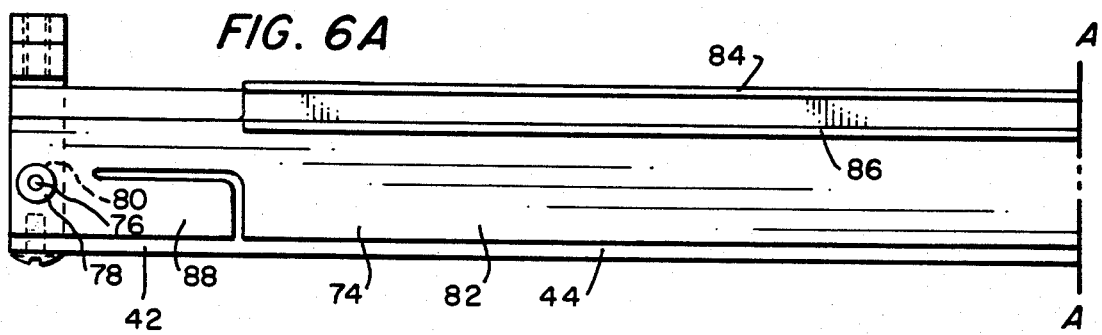
Figure 6B:
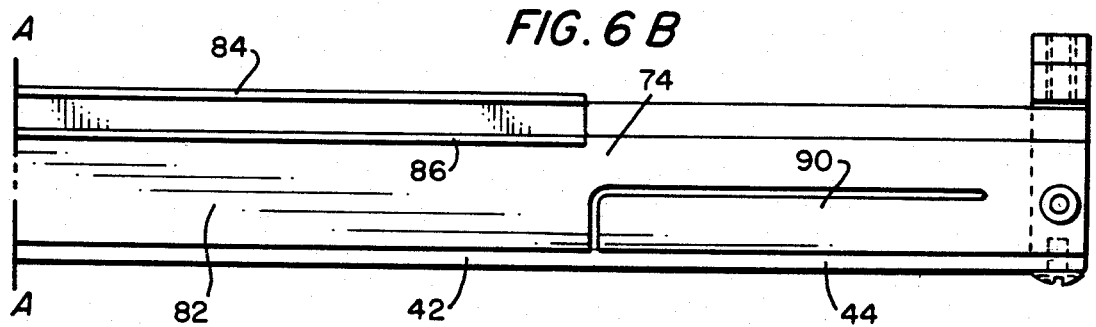
Figure 7A:
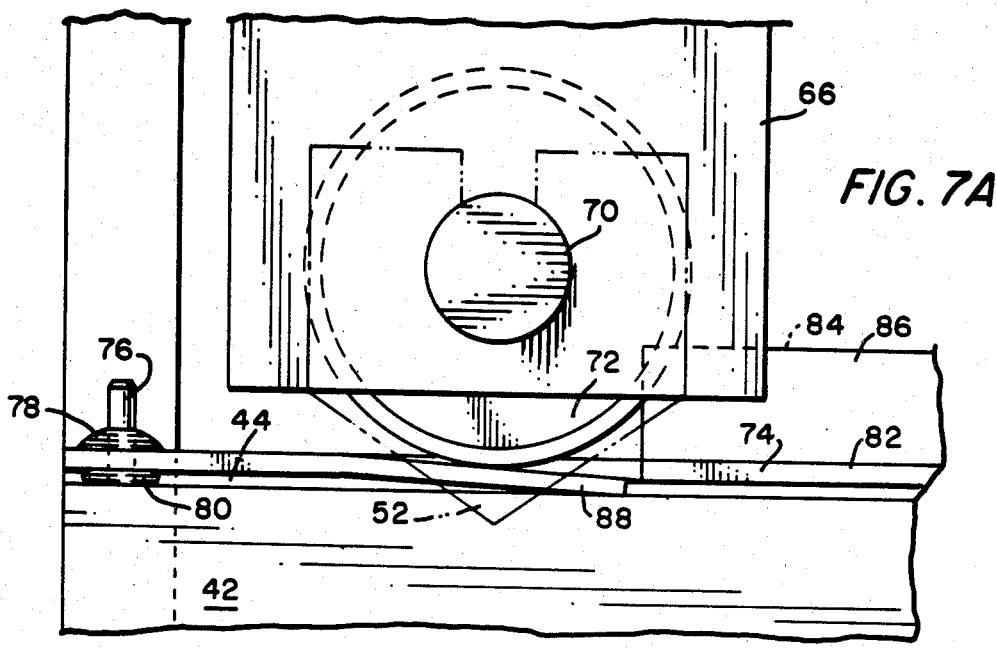
Figure 7B:
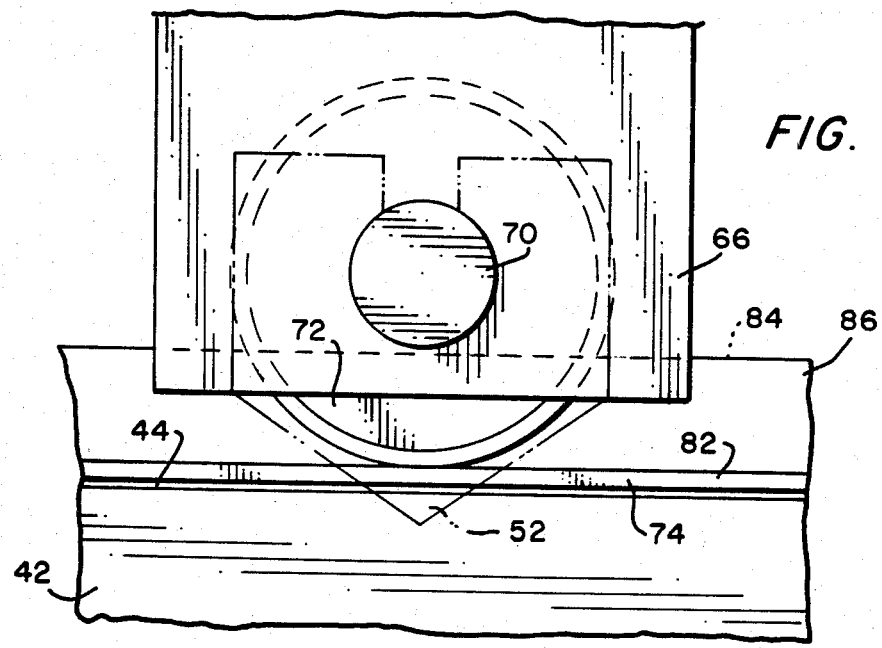

FIGS. 6A and 6B are, respectively, left-hand and right-hand portions of the materials-cutting platform and pressure bar, the same being enlarged over the scale of FIGS. 1-5; and FIGS. 7A and 7B are, respectively, illustrations of fragments of the materials-cutting platform, taken in a plane normal to the cutting blade, showing the wheel and a relief strip in engagement (FIG. 7A) and the wheel in pressured engagement with the body of the pressure bar (FIG. 7B), the same being enlarged over the scale of FIGS. 6A and 6B.

As shown in the figures, the novel dispenser 10, according to an embodiment thereof, comprises a housing 12 having a mounting wall 14, a base 16 normal to the mounting wall, a back wall 18 normal to the base and parallel to the mounting wall 14, and a cutter-access wall 20 joined to walls 14 and 18 and substantially parallel to wall 16. Depending upon how the dispenser is suspended (subsequently explained herein), wall 20 can be a *top* wall or a *front* wall. The aforesaid walls are joined by end walls 22 and 24, to define the housing 12 as an enclosure.

At opposite ends of the housing 12, wall 18 has formed therein a semicircular recess 26 and a right-angular relief 28. The latter define pillow blocks for shafts 30 and 32 of nipping rollers 34 and 36. A pillow block cap 38 is fastened to the wall 18 (at each end of the housing). The recesses, reliefs and caps 38 journal the ends of the shafts 30 and 32 therein, and the reliefs 28 further define a shallow, extended chamber in which is confined a compression spring 40. Ends of the springs 40 bear against the inner surface of wall 20 and the end of shaft 32. This structure obtains at both ends of the housing, as noted; hence, that as shown with particularity in FIG. 4, for one end of the housing, it is to be understood, corresponds with a same arrangement at the end opposite.

A shoulder 39 formed in wall 16 has a right-angular cutting platform 42 fastened thereto; i.e., the platform 42 is fastened, at each end, to the shoulder 39. The platform 42 has a flat, materials-receiving surface 44 which lies in a plane which aligns directly with a slot 46 formed in wall 14. Intermediate the width of wall 14, and axially therealong, is an inwardly-directed rib 48. Slot 46 bisects rib 48 and opens into a diverging mouth 50 formed in the rib 48 within the housing 12. Hence, materials which pass between the rollers 34 and 36 travel upon surface 44 and move into the mouth 50 and through the slot 46. From the nipping entry into the rollers 36 and 36 to the outermost portion of the slot 46 there is defined a linear pathway for the travel of the materials. Intermediate this pathway, selective lengths of the materials may be severed by means of a cutting blade 52.

Wall 20 has formed therein, along a substantial length thereof, first and second trackways 54 and 56, the latter being parallel to each other but offset therebetween. These trackways are joined by a further, third trackway formed in wall 20, this third trackway 58 lying normal to the first and second. Thus, the three trackways define a serpentine entry through the wall 20 and into the housing 12, to inhibit an admittance of light thereinto.

The cutting blade 52 is translatable along the housing by means of a handle 60 which projects above the wall 20. Handle 60 has a bight portion 62 which is slidably movable in the first trackway 54, a planar portion 64 which is slidably movable in the third trackway 58, and a finally depending portion 66 which is slidably movable in the second trackway 56. Blade 52 is fastened to the depending portion 66 by means of a shaft 68 having a threaded end which receives a knurled nut 70. The shaft 68 journals thereon a wheel 72. Wheel 72 is rimmed with an O-ring and is provided to (a) facilitate the axial translation of the handle 60 and blade 52, and (b) aid in restraining materials, bridging between the surface 44 of the platform 42 and the slot 46, forceably upon the surface 44 to enable a clean severance thereof.

A pressure bar 74 is fixed, at each end of the housing 12, to the platform 42, by means of studs 76 and friction washers or retainers 78. However, the bar 74 is fixed in slight elevation over the platform 42 by means of O-ring spacers 80. Pressure bar 74 has a principal planar portion 82 which lies parallel to surface 44 of the platform 42, and two angularly displaced rib portions. A first of these portions, denoted by the index number 84, is diagonally disposed relative to portion 82, to cause materials passed thereto, from the nipping rollers 34 and 36, to move between the pressure bar 74 and the platform 42. The other portion 86 of the pressure bar 74, i.e., the other rib portion 86, extends normal to the planar portion 82 simply to define a strengthening rib for the bar 74. It serves to maintain the pressure bar 74 in its slight suspension above the platform 42.

Adjacent opposite ends thereof, the pressure bar has cantilevered strips 88 and 90 of differing axial lengths. Each of the strips 88 and 90 define yieldable, depression-providing elements onto which the wheel 72 may come to rest without pressuring the principal portion of the pressure bar 74. Thus, the handle 60 is used to move the wheel 72 to strip 88, before materials are payed out through the housing, in order that the material may pass between the pressure bar 72 and the platform 42. When a desired length of material has been payed out, and it is desired to sever the material, then the handle 60 is used to move the wheel 72 from the strip 88 and into pressured engagement with the principal or planar portion 82 of the pressure bar 74. This action forces the material and pressure bar 74 into a tight engagement with the platform 42, and the cutting blade 52 will move along the edge of the platform making a clean severance of the material.

As can be seen to best advantage in FIG. 1, the travel of the handle 60 is limited by the extent of the first trackway 54. When the handle 60 is in the extreme left-hand positioning (as viewed in FIG. 1) in trackway 54, the wheel 72 is at rest on strip 88. When the handle 60 is in the extreme right-hand positioning in trackway 54, the wheel 72 is at rest on the inboard portion of the strip 90. However, wall 20 has a door 92 slidably disposed therein, the outermost surface of the door having a finger-access recess 94 formed therein. By simply sliding the door 92 away from the wall, by means of the recess 94, it can be removed from the wall 20. Then the handle 60 may travel further, and the assembly defined of the handle 60, wheel 72, and blade 52 can be removed as a unit from the housing. This provisioning is made in order that the blade 52 or the O-ring rimming the wheel 72 may be replaced if either or both are worn.

Intermediate the axial length of wall 20 is a shallow recess 96. The latter has a slot 98 formed therebelow. A bail 102 is suspended in the aforesaid slot 98, and the bail has a U-shaped bend in the innermost end thereof. Finally, a hand-knob 104 is secured to the outermost end thereof. Roller 34 is interrupted thereat, to expose the mid-portion of the shaft 32 thereof. The U-shaped bend portion of the bail 102 circumscribes the exposed shaft portion. Accordingly, by grasping the hand-knob 104, and moving it away from the wall 20, the roller 34 is lifted or moved away from roller 36. The shaft ends compress the springs 40, and the rollers 34 and 36 define an axially-extended opening therebetween. When the bail 102 is released, the rollers return to a mutially-engaged contact. The wall 20 has a shoulder 106 formed adjacent to the recess. Upon the hand-knob being set upon the shoulder 106, the rollers are held in spaced-apart disposition. Thus, when a leader end of a fresh roll of material needs to be set into the housing 12, the hand-knob 104 is pulled and set upon the shoulder. The leader end of the fresh roll of material is inserted between the parted rollers, and then the hand-knob 104 is pushed off the shoulder; the rollers nip the leader end of the roll of material, and can pay the material through the housing.

A handwheel 108 is shown coupled to roller 36. Now, while not shown, the outermost ends of the shaft 30 are hollow, and either end can receive the handwheel stub 110. Hence, the rollers may be made to rotate in contacting, counter-rotation, by means of the handwheel 108 at either a left-hand or a right-hand end of the housing; the stub 110 is frictionally engaged with the shaft 30.

Projecting from wall 18 is a channel 112. The same has a pair of substantially parallel end walls 114 and 116, and substantially parallel side walls 118 and 120. These four walls define a frame having a depth of the extent of wall 120 which nestably receives the leading or sheet-material-discharging portion 122 of a sheet material cassette 124. Cassette portion 122 comprises a sort of trough which intimately engages the aforesaid walls. It has engaged ribs 126 which extend to an outermost nose 128, the ribs, albeit in light-sealing engagement, defining a parting line of the trough. The wall 18 has an axially-extended slot 130 formed therein in which the nose 128 is received. However, to either sides of the nose 128, and set back therefrom, the cassette 124 has a series of lugs 132 projecting therefrom. While only two thereof are shown, it is to be understood that there are a plurality thereof, axially spaced apart, extending lengthwise of the nose 128 and on each side thereof. Each lug 132 has a tapered surface 134, said surfaces diverging from each other across the nose 128 and outwardly of the cassette 124. The wall 18 has a corresponding series of apertures 136 in which to receive the lugs 132, each of the apertures also having a tapered surface complementary to surfaces 134. Upon the cassette 124 being set into the frame defined by the walls 114, 116, 118 and 120, and the nose 128 thereof being pushed toward the opening or slot 130, the surfaces 134 impinge on the outermost portions of the surfaces of apertures 136. On forcing the cassette 124 into a bottoming in the channel 112, with the nose 128 passed into the slot 130, the lugs 132 are forced apart, on each side of the nose 128, and cause a slight opening of the parting line at the nose 128. This accommodates a pay-out of materials from the cassette 124 to the nip of the rollers 34 and 36. Thus, until the cassette 124 is fully bottomed in the channel 112, it is wholly light-tight, having only a leader (not shown) of the material confined therein projecting a short length from the nose 128. With the bottoming of the cassette 124 in the channel, the camming effect of the lugs 132 and the apertures 136 effect a slight parting of the nose 128 and free up the sheet material leader. However, the circumscribing walls 114, 116, 118 and 120 shield the material from light.

The cassette 124 has a transverse rib 138 extending along each axial end thereof, and the walls 114 and 116 have mounted therein spring latches 140. The latches 140 project from the aforeaid walls, and right-angular portions of the latches resiliently negotiate the ribs 138 and hold the cassette fast in the channel 112.

Figure 3:
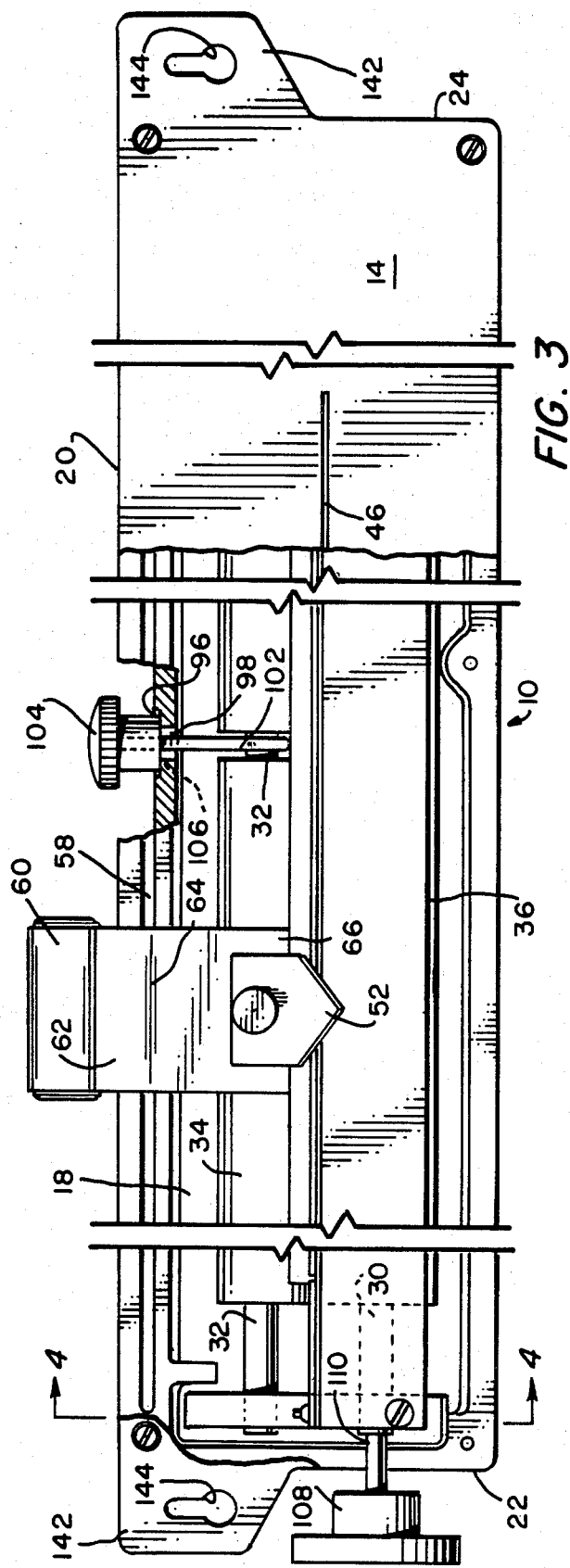
FIG. 3 is an axially-discontinuous, frontal view of the embodiment, with a portion of the front wall of the housing broken away to show constructional details.
Figure 5:
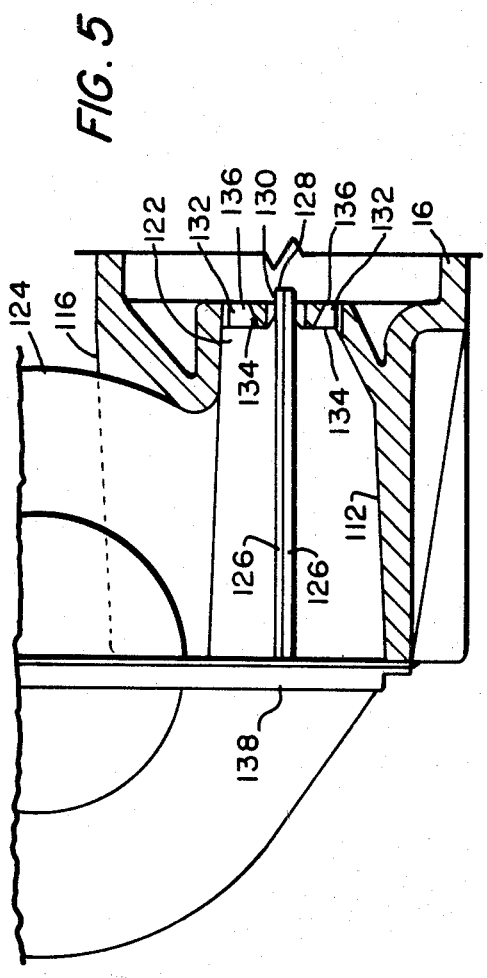
FIG. 5 is a cross-sectional view of the embodiment taken intermediate the cassette-receiving channel thereof, the side walls of the channel-defined frame being cross-hatched, and a nested cassette being shown in full-line illustration.
Figure 4:
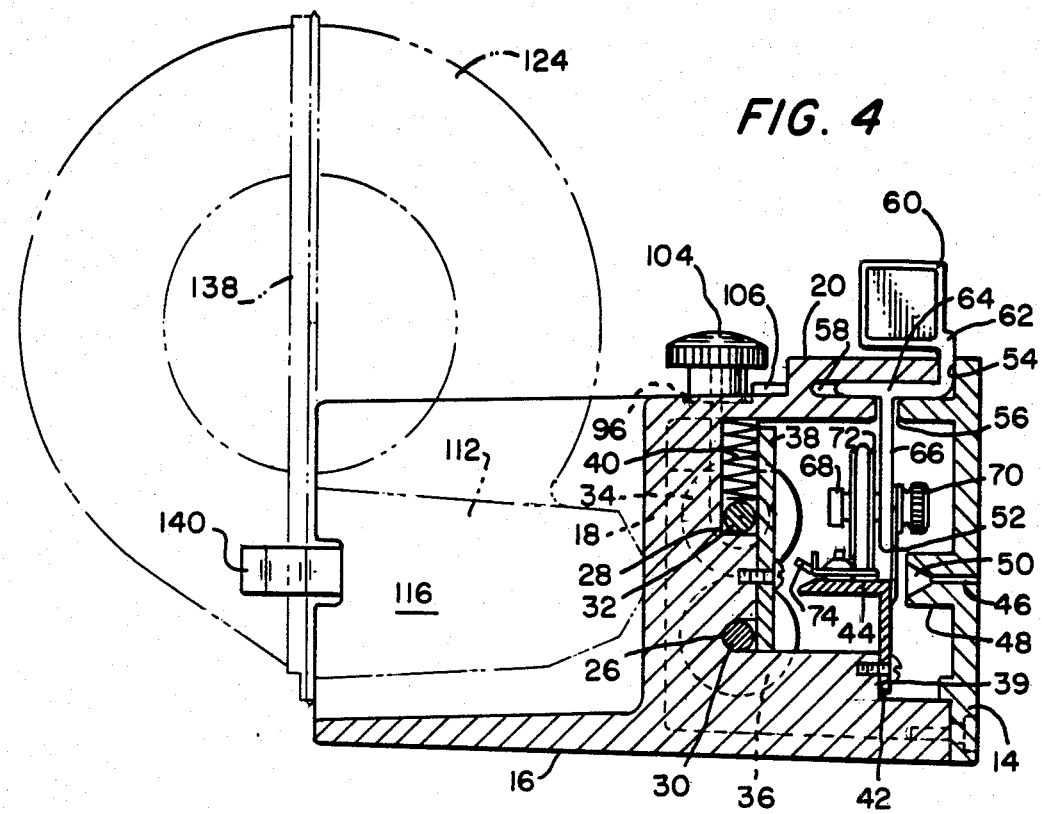
FIG. 4 is a cross-sectional view taken along section 4—4 of FIG. 3.

As seen in FIG. 3, wall 14 has outwardly extending ears 142 with mounting holes 144 formed therein for suspending the dispenser 10 in the attitude shown in FIG. 4. Alternatively, the dispenser 10 can be suspended in a mounting attitude rotated ninety degrees of arc, clockwise, from that shown in FIG. 4. To accommodate this latter attitude, outboard extensions 146 and 146a of wall 118 also have mounting holes 144 formed therein.

While I have described my invention in connection with a specific embodiment thereof it is to be clearly understood that this is done only by way of example, and not as a limitation of the scope of my invention as set forth in the objects thereof and in the appended claims.

I claim:

1. Dispenser means for rolled sheet materials, such as negative stock, emulsified paper, and like photographic supplies, comprising:

a housing having an outer wall with a materials-discharging slot formed therein;

said housing further having first means comprising nipping rollers therewithin operative (a) for grasping an end of rolled sheet material, and (b) for moving any selective lengths of such sheet material through said housing along a given pathway into said slot;

said housing also having second means therewithin, and interposed intermediate said rollers and said slot, operative for (a) gripping sheet material disposed in said pathway, and (b) severing such aforesaid selective lengths of such gripped sheet material; wherein said first and second means each has a means (a) manipulatable for, and (b) requiring manipulation for, effecting operation thereof independent of operation of the other thereof, whereby said first means is manipulatably operative for moving arbitrarily chosen lengths of such sheet material along said pathway, and said second means is manipulatably operative for severing such chosen lengths; and said housing further having a channel for nestably receiving therewithin only a sheet material-discharging portion of a sheet material cassette; wherein said channel is defined by substantially parallel, spaced-apart end walls, and substantially parallel, spaced-apart upper and lower or side walls, forming a substantially rectilinear frame, having a given depth, for light-sealingly nesting therewithin such sheet material-discharging portion of a sheet material cassette.

2. Dispenser means, according to claim 1, further including:

means supported by walls of said channel for releasably latching a sheet material cassette, upon such cassette having a sheet material-discharging portion thereof nested in said frame, to restrain such cassette from inadvertent displacement thereof from said channel.

* * * * *